Sept. 5, 1967     F. H. BARNES     3,339,720

METAL FASTENER STRIP

Filed Dec. 28, 1965

INVENTOR.
Fayette Herbert Barnes
BY
*Irving Seidman*
ATTORNEY

United States Patent Office 3,339,720
Patented Sept. 5, 1967

3,339,720
METAL FASTENER STRIP
Fayette Herbert Barnes, 16 Rainbow Trail,
Mountain Lakes, N.J. 07046
Filed Dec. 28, 1965, Ser. No. 516,860
3 Claims. (Cl. 206—56)

This invention relates to metal fastener strips, and more particularly concerns fasteners such as staples or the like in aggregated, side by side relation to form the strip.

Staples and other metal fasteners have been arranged in side by side relation and held together by adhesive to form a strip which may be readily loaded into the magazine of combination dispensing and applying devices.

However, such known fastener strips present problems in usage due to the presence of the adherent agent which holds the fasteners together in strip form. Thus, there is a tendency for the adherent material to transfer from the fastener strips as the same passes through the applying means, to operating elements of the applying means, accumulating in such elements and interfering with the normal operation of the applying means.

Also, the presence of adherent material in residual amounts on the individual fastener members may be objectionable in the particular application of the fastener members.

Further, in the application of the adherent material to the fasteners to form the conventional clips, the deposit may be non-uniform along the length of the strip, with excessive amounts of adherent at some points and deficient amounts of adherent at other points. Such nonuniformity of adherent deposit on the fastener strip presents problems in handling the strips, inserting the same into the magazine of the applying device and in the applying operation.

Accordingly, an object of this invention is to provide an improved metallic fastener strip in which the individual fasteners are autogenously secured together in side by side relation, the strip being devoid of adhesives or other added materials, so as to facilitate the use of such strips in conventional dispensing and applying devices.

Another object of this invention is to provide an improved fastener strip of the character described, wherein the fasteners are secured together by autogenous welds; the welding operation by which the welds are formed being precisely controlled so as to regulate the extent of cohesion of the individual fasteners to each other to suit the particular dispensing and applying device in which the strip is used.

A further object of this invention is to provide an improved metal fastener strip wherein the individual fasteners may be of various configurations and including U-shaped members; the opposed surfaces of the successive fasteners in the strip being of various geometric shapes; such opposed surfaces being autogenously welded together, the welded areas having discontinuities or projections thereon; the extent and nature of the welded areas being subject to regulation so as to determine the forces and conditions necessary to effect separation of the individual fasteners from the strip in the applying operation.

Other objects of this invention will in part be obvious and in part hereinafter pointed out.

Essentially, the metal fastener strip of the instant invention comprises conventional metal fasteners of various shapes and configurations, including staples, hog clips and the like, which can be aggregated in side by side relation to form a strip. The individual fasteners in the strip are adhered to each other solely by autogenous welds of opposed surface portions.

Figure 1:
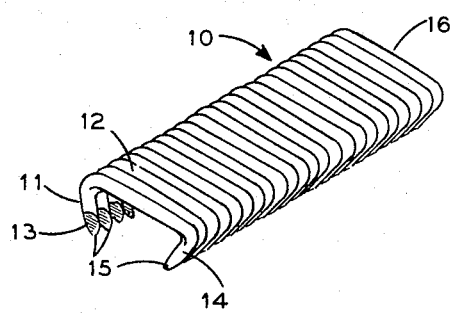
FIG. 1 is a perspective view showing a strip of metal fasteners embodying the invention.
Figure 4:
FIG. 4 is an enlarged sectional view showing the fastener elements in adjacent relation.
Figure 2:
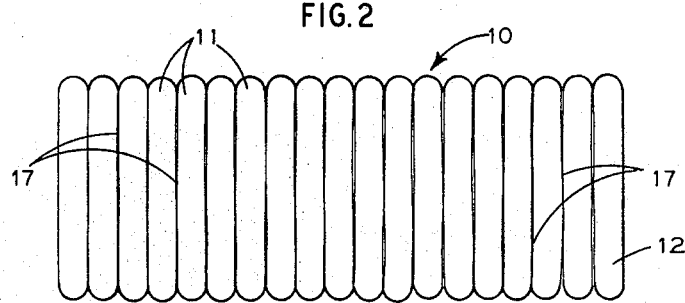
FIG. 2 is an enlarged top plan view showing a portion of said strip.
Figure 3:
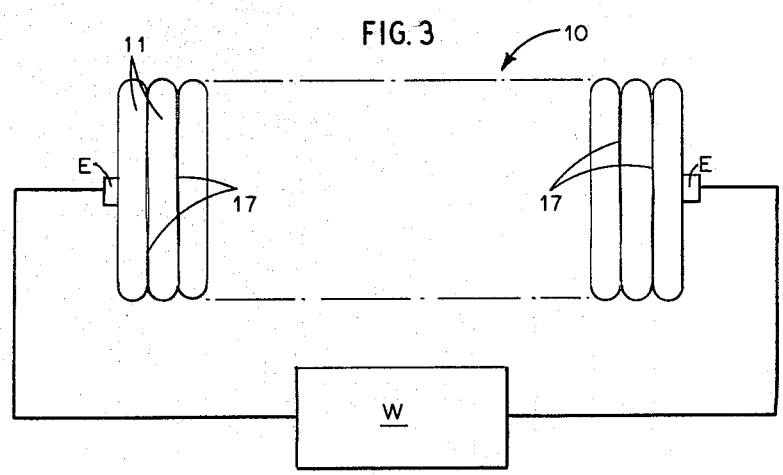
FIG. 3 is a diagrammatic view showing the manner in which the fastener strip may be formed.

Thus, as shown in FIG. 1, 10 designates a strip of metallic fasteners embodying the invention. The strip 10 comprises individual U-shaped members 11 which have a top portion 12 and converging leg portions 13, 14 extending from the top portion 12 and terminating in sharp points 15.

The individual fastener members 11 have a circular cross section with an arcuate surface configuration 16. The members 11 are arranged in side by side relation to form a unitized strip, the surface portion 16 of immediately adjacent members 11 being in tangential relation to each other.

The members 11 in strip 10 are secured together by autogenously welding limited surface areas indicated at 17 of adjacent members. This is readily accomplished by the use of a conventional resistance welding device indicated at W having the usual welding electrodes E. The members 11 forming strip are held in clamped relation to each other by suitable means, not shown and the electrodes E are applied at opposite ends of strip 10.

The welding device W is then operated under precision control to effect the autogenous welding of the contacting surface areas 17. As the opposed surface portions 16 of the individual members 11 are not absolutely uniform having surface irregularities throughout their length, the actual contact areas 17 are in spaced relation to each other, providing discontinuous weld areas or projections.

It has been found that with suitable regulation of the clamping action on the strip of fasteners 11 and with precision control of welding means W, the extent of the weldments 17 and intervening spaces 18 between members 11, may be controlled so as to permit the individual fasteners 11 to be separated from strip 10 in accordance with the action of the particular dispensing and applying device used.

With strips 10 having individual fasteners 11 secured together by autogenous welds, the fasteners are readily separable from the strip as the same is disposed in the magazine of the conventional applying means. The absence of adherent material in the strip has substantially improved the operational efficiency of the applying means and has materially reduced maintenance of such applying means.

It is understood that the strip 10 may be made up of individual members having various geometrical configurations, including conventional staples and the like. Further, the cross section of such members may be of varied shape including planar surface portions as well as those of arcuate form. In all cases there will be sufficient discontinuities between successive weldments joining the adjacent members, to allow for ready separation of the individual fasteners from the strip in accordance with the operation of the applying device carrying such strip.

Also, the metal fastener members may be formed of various metals and metallic alloys and may have plated surface portions. In each case, the operation of the welding device W is regulated to adjust the extent and type of weld best suited to the particular material of which the fastener is formed.

As various changes might be made in the embodiments of the invention without departing from the spirit thereof, it is understood that all matter herein shown or described shall be deemed illustrative and not limiting except as set forth in the appended claims.

What is claimed is:

1. A U-shaped elongated strip of metallic fasteners, each of said fasteners being of U-shape and disposed in side-by-side abutting relation, said fasteners having surface irregularities which define minute spaced surface projections, spaced projections of one fastener being resistance welded to opposed spaced surface areas of the fasteners immediately adjacent said one fastener by passing an electrical current from one end of the strip to the other, the spacing between the welded fused areas of one pair of adjacent fasteners being of a different pattern from that of another pair of adjacent connected fasteners so that adjacent fasteners are in discontinuous abutment, whereby said fasteners are retained in strip form yet allowing individual fasteners to be readily separated from the fasteners immediately adjacent thereto by fracture of the welded metal portions connecting said fasteners together.

2. A fastener strip as in claim 1 wherein said members are of arcuate section.

3. A fastener strip as in claim 1 wherein said members have substantially flat top portions and converging leg portions extending from said top portions.

References Cited

UNITED STATES PATENTS

| 329,953 | 11/1885 | Richards. |
| 1,162,823 | 12/1915 | Tolman. |
| 1,557,121 | 10/1925 | Vogel. |
| 1,733,506 | 10/1929 | Maynard _____ 59—79 XR |

FOREIGN PATENTS

| 1,218,818 | 12/1959 | France. |

THERON E. CONDON, *Primary Examiner.*

J. M. CASKIE, *Assistant Examiner.*